(12) United States Patent
Harpaz

(10) Patent No.: US 9,391,455 B2
(45) Date of Patent: Jul. 12, 2016

(54) SYSTEM FOR SWITCHING BETWEEN POWER SUPPLY UNITS

(71) Applicant: Harmonic, Inc., San Jose, CA (US)

(72) Inventor: Nadav Harpaz, Moshav Hadar Am (IL)

(73) Assignee: Harmonic, Inc., San Jose, CA (US)

( * ) Notice: Subject to any disclaimer, the term of this patent is extended or adjusted under 35 U.S.C. 154(b) by 443 days.

(21) Appl. No.: 14/013,057

(22) Filed: Aug. 29, 2013

(65) Prior Publication Data

US 2015/0061396 A1    Mar. 5, 2015

(51) Int. Cl.
*H02J 1/00* (2006.01)
*H02J 3/00* (2006.01)
*H02J 1/10* (2006.01)

(52) U.S. Cl.
CPC .............. *H02J 1/10* (2013.01); *Y10T 307/696* (2015.04)

(58) Field of Classification Search
CPC ............... H02J 4/00; H02J 1/00; H02J 1/10; H02J 3/38; H02J 1/102; H02J 3/383; H02J 7/0068; H02J 3/46; H02J 3/32; H02J 7/0024; H02J 7/0063; H02J 7/34; H02J 7/35; H02J 9/062; H02J 2001/106
USPC .......................................................... 307/80
See application file for complete search history.

(56) References Cited

U.S. PATENT DOCUMENTS

| | | | | |
|---|---|---|---|---|
| 6,122,273 | A * | 9/2000 | Cantwell | H04B 1/74 370/359 |
| 6,847,249 | B1 * | 1/2005 | Brokaw | H03K 17/693 327/407 |
| 8,212,390 | B1 * | 7/2012 | Robinson | H02J 1/04 307/150 |
| 8,836,167 | B2 * | 9/2014 | Chen | H02J 9/061 307/80 |
| 2007/0103252 | A1 * | 5/2007 | Nakatsuka | H01P 1/15 333/103 |
| 2012/0032505 | A1 * | 2/2012 | Kusumi | B60L 11/123 307/10.1 |
| 2012/0267958 | A1 * | 10/2012 | Hou | H02J 9/005 307/80 |
| 2013/0082647 | A1 * | 4/2013 | Yoon | H02J 5/005 320/108 |
| 2013/0336016 | A1 * | 12/2013 | Shiji | H02M 3/33507 363/21.02 |
| 2014/0001867 | A1 * | 1/2014 | Lin | H02J 3/383 307/80 |

* cited by examiner

*Primary Examiner* — Jared Fureman
*Assistant Examiner* — Esayas Yeshaw
(74) *Attorney, Agent, or Firm* — Brokaw Patent Law PC; Christopher J. Brokaw

(57) ABSTRACT

A system for switching between first and second voltage supply units, the system may include a first interface unit that is connected between a first voltage supply unit and an output unit, a second interface unit that is connected between a second voltage supply unit and the output unit; a controller that is arranged to select a selected voltage supply unit and to instruct the first and second interface units and the output unit to facilitate a provision of a selected supply voltage provided from the selected voltage supply unit to a load coupled to the output unit. Each interface unit may include a positive input port, a negative input port, a positive output port and a negative output port. The negative and positive output ports of the first interface unit are isolated from the negative and positive output ports of the second interface unit, respectively.

15 Claims, 3 Drawing Sheets

SYSTEM FOR SWITCHING BETWEEN POWER SUPPLY UNITS

BACKGROUND

Communication systems are expected to withstand various failures such as but not limited to voltage supply unit failures.

There is a need to provide a system that will allow a load (such as a load of a communication system) to be coupled to multiple voltage supply units in an efficient manner.

SUMMARY

According to an embodiment of the invention there may be provided a system for switching between first and second voltage supply units, the system may include: an output unit, a first interface unit, a second interface unit; and a controller. The first interface unit may be connected between the first voltage supply unit and the output unit. The second interface unit may be connected between the second voltage supply unit and the output unit. The controller may be arranged to select a selected voltage supply unit and to instruct the first and second interface units and the output unit to facilitate a provision of a selected supply voltage provided from the selected voltage supply unit to a load connected to the output unit. Each one of the first and second interface units may include a positive input port, a negative input port, a positive output port and a negative output port. A negative output port of the first interface unit may be isolated from a negative output port of the second interface unit. A positive output port of the first interface unit may be isolated from a positive output port of the second interface unit.

The first interface unit may include: (a) a first pair of electrical components that may include a first field-effect (FET) transistor and a first diode that are connected in parallel to each other; (b) a second pair of electrical components that may include a second FET transistor and a second diode. The first pair and the second pair are connected to each other in a sequential manner between the positive input port and the positive output port of the first interface unit; (c) a third pair of electrical components that may include a third FET transistor and a third diode that are connected in parallel to each other; and (d) a fourth pair of electrical components that may include a fourth FET transistor and a fourth diode; the third pair and the fourth pair are connected to each other in a sequential manner between the negative output and input ports of the first interface unit.

The forward direction of the first and third diodes may be opposite to a forward direction of the second and fourth diodes.

The second interface unit may include: (a) a fifth pair of electrical components that may include a fifth FET transistor and a fifth diode that are connected in parallel to each other; (b) a sixth pair of electrical components that may include a sixth FET transistor and a sixth diode. The fifth pair and the sixth pair are connected to each other in a sequential manner between the positive input port and the positive output port of the second interface unit; (c) a seventh pair of electrical components that may include a seventh FET transistor and a seventh diode that are connected in parallel to each other; and (d) an eighth pair of electrical components that may include an eighth FET transistor and an eighth diode. The seventh pair and the eighth pair are connected to each other in a sequential manner between the negative output and input ports of the second interface unit.

The forward direction of the fifth and seventh diodes may be opposite to a forward direction of the sixth and eighth diodes.

The controller may be arranged to prevent the supply the selected supply voltage until the selected supply voltage exceeds a predetermined minimal threshold.

The controller may be arranged to stop a provision of supply voltage from a non-selected voltage supply unit until the selected supply voltage exceeds a predetermined minimal threshold.

The system may include a boost generator that may be arranged to provide a boost signal of a value that exceeds values of first and second supply voltage supplied by the first and second voltage supply units; the boost signal may be used for controlling the first and second interface units.

The boost generator may be arranged to provide a boost signal that may be higher by a predetermined amount that a maximal voltage out of the first and second supply voltages.

The boost generator may be arranged to track the maximal voltage.

The output unit may be a hot swap unit that may be arranged to receive first and second supply voltages via the first and second interface units and to switch between the first and second supply voltages.

The hot swap unit may be arranged to gradually increase an output voltage and to check for a load short before providing an output voltage of a full value to the load.

According to an embodiment of the invention there may be provided a system for switching between first and second voltage supply units. The system may include an output unit, a first interface unit, a second interface unit; and a controller. The first interface unit may be connected between the first voltage supply unit and the output unit. The second interface unit may be connected between the second voltage supply unit and the output unit. The controller may be arranged to select a selected voltage supply unit and to instruct the first and second interface units and the output unit to facilitate a provision of a selected supply voltage provided from the selected voltage supply unit to a load connected to the output unit. Each one of the first and second interface units may include a positive input port, a negative input port, a positive output port and a negative output port. The first interface unit may include a (a) first pair of electrical components that may include a first field-effect (FET) transistor and a first diode that are connected in parallel to each other; (b) a second pair of electrical components that may include a second FET transistor and a second diode. The first pair and the second pair are connected to each other in a sequential manner between the positive input port and the positive output port of the first interface unit; (c) a third pair of electrical components that may include a third FET transistor and a third diode that are connected in parallel to each other; and (d) a fourth pair of electrical components that may include a fourth FET transistor and a fourth diode. The third pair and the fourth pair are connected to each other in a sequential manner between the negative output and input ports of the first interface unit.

The forward direction of the first and third diodes may be opposite to a forward direction of the second and fourth diodes.

The second interface unit may include: (a) a fifth pair of electrical components that may include a fifth FET transistor and a fifth diode that are connected in parallel to each other; (b) a sixth pair of electrical components that may include a sixth FET transistor and a sixth diode. The fifth pair and the sixth pair are connected to each other in a sequential manner between the positive input port and the positive output port of the second interface unit; (c) a seventh pair of electrical components that may include a seventh FET transistor and a seventh diode that are connected in parallel to each other; and (d) an eighth pair of electrical components that may include an eighth FET transistor and an eighth diode. The seventh pair and the eighth pair are connected to each other in a sequential manner between the negative output and input ports of the second interface unit.

The forward direction of the fifth and seventh diodes may be opposite to a forward direction of the sixth and eighth diodes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
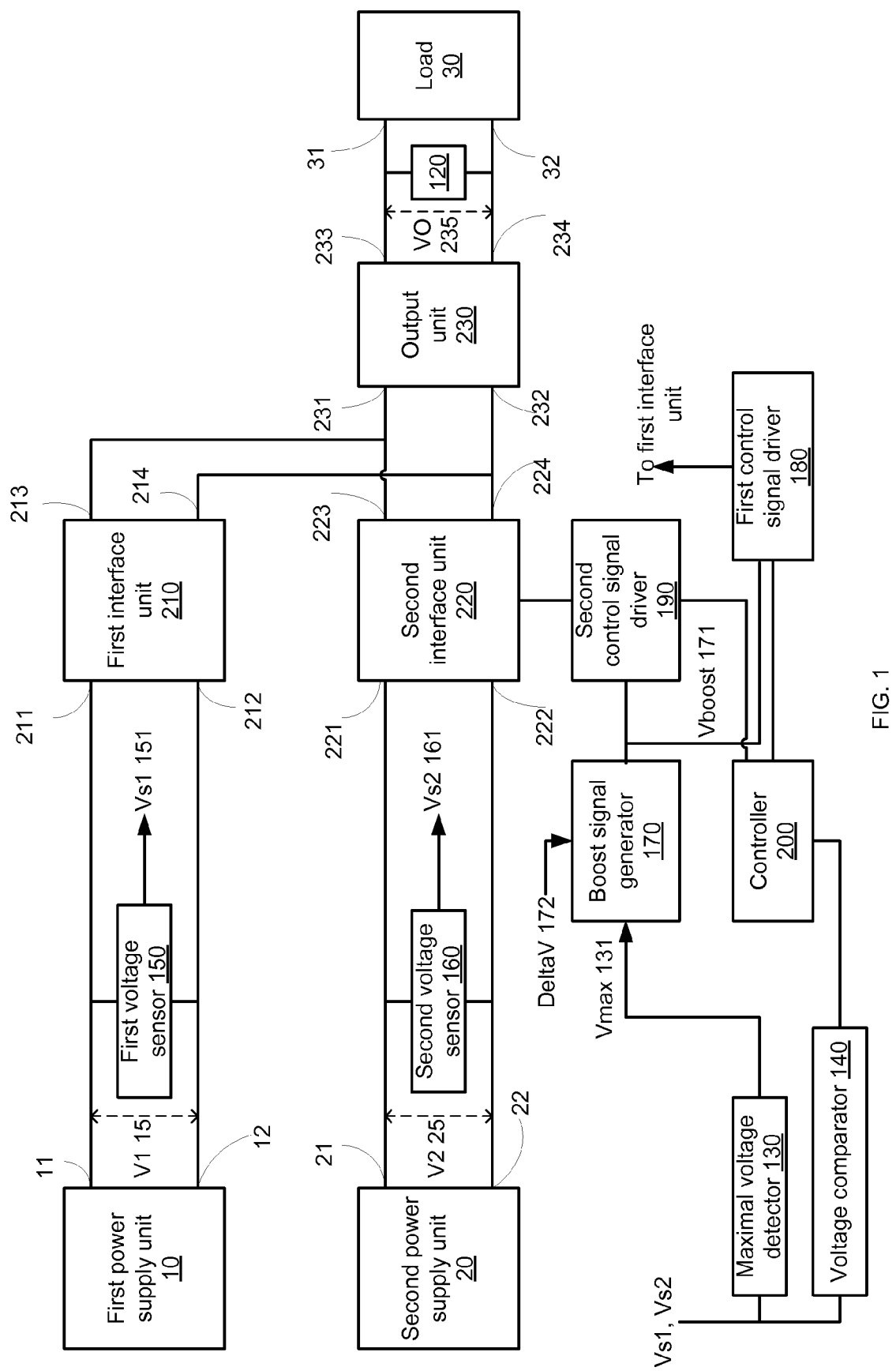
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

FIG. 1 illustrates first and second voltage supply units, a system and a load according to an embodiment of the invention.

System 10 may be used for switching between first and second voltage supply units 10 and 20 and may include:
  a. An output unit 230.
  b. A first interface unit 210.
  c. A second interface unit 220.
  d. Controller 200.
  e. Maximal voltage detector 130.
  f. Voltage comparator 140.
  g. Boost signal generator 170.
  h. First voltage sensor 150.
  i. Second voltage sensor 160.
  j. First control signal driver 180.
  k. Second control signal driver 190.
  l. Output voltage sensor 120.

The first interface unit 210 is coupled between the first voltage supply unit 10 and the output unit 230. The second interface unit 220 is coupled between the second voltage supply unit 20 and the output unit 230.

A positive output port 11 of the first power supply unit 10 is connected to a positive input port 211 of the first interface unit 210.

A negative output port 12 of the first power supply unit 10 is connected to a negative input port 212 of the first interface unit 210.

A positive output port 21 of the second power supply unit 20 is connected to a positive input port 221 of the second interface unit 220.

A negative output port 22 of the second power supply unit 20 is connected to a negative input port 222 of the second interface unit 220.

Positive output ports 213 and 223 of first and second interface units 210 and 220 respectively are connected to a positive input port 231 of output unit 230.

Negative output ports 214 and 224 of first and second interface units 210 and 220 respectively are connected to a negative input port 232 of output unit 230.

A positive output port 233 of the output unit 230 is connected to a positive input port 31 of the load 30.

A negative output port 234 of the output unit 230 is connected to a negative input port 32 of the load 30.

The first interface unit 210 disconnects both positive and negative ports (213 and 214) when it is not selected. The second interface unit 220 disconnects both positive and negative ports (223 and 224) when it is not selected. This prevents current to flow from one power supply unit to the other via the ports of the first and second interfaces. This may prevent a buildup of voltage on conductors that are connected to one or more of the power supply units.

According to an embodiment of the invention the negative output port 214 of the first interface unit 210 is isolated from a negative output port 224 of the second interface unit 220. This isolation may allow the first and second interfacing units 210 and 220 to be positioned in a relatively large distance from the first and second voltage supply units 10 and 20. Without such isolation the first and second interfacing units 210 and 220 should be located in proximity to the first and second voltage supply units 10 and 20—in order to prevent the formation of large voltage differences between their shared negative input ports.

A first voltage sensor 150 is connected between the positive and negative output ports 11 and 12 of the first supply unit 10. It outputs a first sensed voltage Vs1 151 that represents the first supply voltage V1 15 supplied by the first voltage supply unit 10.

A second voltage sensor 150 is connected between the positive and negative output ports 11 and 12 of the second supply unit 20. It outputs a second sensed voltage Vs2 161 that represents the second supply voltage V2 25 supplied by the second voltage supply unit 20.

An output voltage sensor 120 is connected between the positive and negative output ports 233 and 234 of the output unit 230. It outputs an output sensed voltage that represents the output voltage supplied by the output unit 230.

The maximal voltage detector 130 finds a maximal voltage out of the first and second supply voltages V1 and V2 (given Vs1 and Vs2) and then outputs a maximal voltage Vmax 131 that has a value that equals MAX(Vs1, Vs2).

Voltage comparator 140 compares between Vs1 and Vs2 and can provide an indicator to the controller 200 about the highest supply voltage out of V1 and V2 (given Vs1 and Vs2). The voltage comparators 140 may include (or may be preceded by) filters that smooth Vs1 and Vs2 in order to allow the voltage comparator 140 to ignore noises and/or temporal spikes. The voltage comparator 140 may include (or may be followed by) a circuit for preventing fast changes in its indicator—especially to prevent the indicator from quickly alternating between different values. The circuit can be a hysteresis circuit.

Vmax 131 and DeltaV 172 are supplied to the boost signal generator 170 that outputs a boost signal Vboost 171 of a value that exceeds the maximal values of V1 and V2 by Vmax 131. The boost signal Vboost 171 is used for controlling the first and second interface units 210 and 220. It is used for switching switches that are fed by the first and/or second supply voltages.

Vboost 171 may be higher by a predetermined amount than Vmax 131.

The controller 200 is arranged to select a selected voltage supply unit and to instruct the first and second interface units 210 and 220 and the output unit 230 to facilitate a provision of a selected supply voltage provided from the selected voltage supply unit to load 30.

The controller can apply one or more protection schemes. This may include, for example, preventing the supply the selected supply voltage until the selected supply voltage exceeds a predetermined minimal threshold. Yet for another example, the controller may stop a provision of supply voltage from a non-selected voltage supply unit until the selected supply voltage exceeds a predetermined minimal threshold. Yet for a further example—the controller may include a circuit that prevent opening (selecting) both first and second supply voltages at the same time. A XOR gate may be connected to the control signals sent to first and second interface units 210 and 210 and may alert when the value of both control signals indicates that both interface units are selected.

The output unit 30 may be a hot swap unit that is arranged to receive first and second supply voltages V1 14 and V2 25 the first and second interface units 210 and 220 and to switch between the first and second supply voltages V1 and V2.

According to an embodiment of the invention the hot swap unit is arranged to gradually increase an output voltage VO 235 and to check for a load short before providing an output voltage of a full value to the load. The hot swap unit can include a FET transistor 231 that is gradually opened in order to increase the value of VO 235.

After a certain increment of VO 235 the hot swap unit can sense whether the voltage on the load 30 increase (by at least a predetermined amount)—and thus there is no short—and VO 235 may be further increased.

Figure 2:
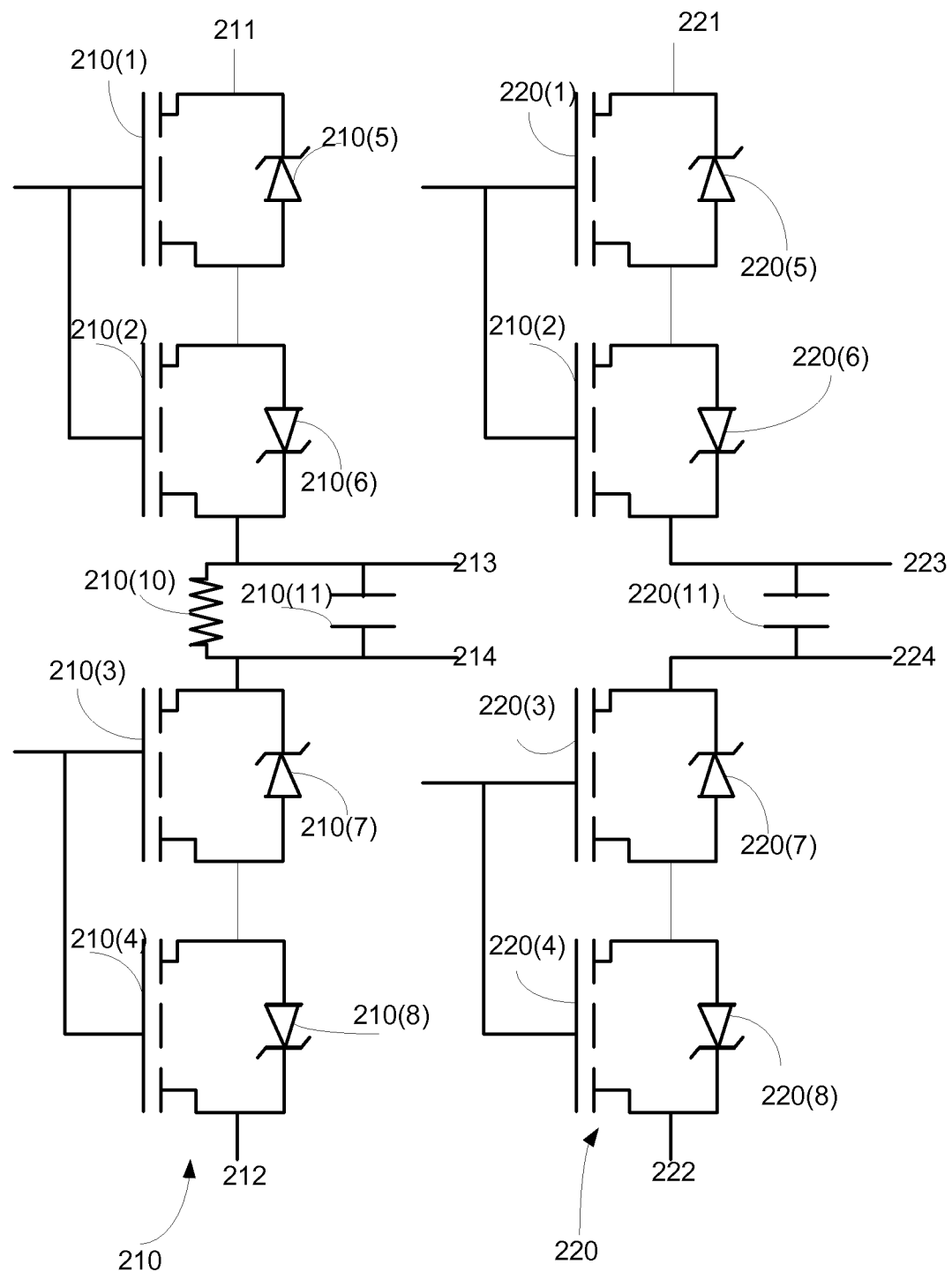
FIG. 2 illustrates first and second interface units according to an embodiment of the invention.

FIG. 2 illustrates first and second interface units 210 and 220 according to an embodiment of the invention.

First interface unit 210 may include:
a. A first pair of electrical components that comprise a first field-effect (FET) transistor 210(1) and a first diode 210(5) that are coupled in parallel to each other.
b. A second pair of electrical components that may include a second FET transistor 210(2) and a second diode 210(6). The first pair and the second pair are coupled to each other in a sequential manner between the positive input port 211 and the positive output port 213 of the first interface unit 210.
c. A third pair of electrical components that comprise a third FET transistor 210(3) and a third diode that are coupled in parallel to each other.
d. A fourth pair of electrical components that may include a fourth FET transistor 210(4) and a fourth diode 210(8).
e. A resistor 210(10) and capacitor 210(11) that are connected in parallel between the positive and negative output ports 213 and 214 of the first interface unit 210. The third pair and the fourth pair are coupled to each other in a sequential manner between the negative output port 214 and the negative input port 212 of the first interface unit 210.

The forward direction of the first and third diodes 210(5) and 210(7) is opposite to a forward direction of the second and fourth diodes 210(6) and 210(8).

Second interface unit 220 may include:
a. A fifth pair of electrical components that comprise a fifth field-effect (FET) transistor 220(1) and a fifth diode 220(5) that are coupled in parallel to each other.
b. A sixth pair of electrical components that may include a sixth FET transistor 220(2) and a sixth diode 220(6). The fifth pair and the sixth pair are coupled to each other in a sequential manner between the positive input port 221 and the positive output port 223 of the second interface unit 220.
c. A seventh pair of electrical components that comprise a seventh FET transistor 220(3) and a seventh diode that are coupled in parallel to each other.
d. A eighth pair of electrical components that may include an eighth FET transistor 220(4) and an eighth diode 220(8).
e. A capacitor 220(11) that are connected in parallel between the positive and negative output ports 223 and 224 of the second interface unit 220. The seventh pair and the eighth pair are coupled to each other in a sequential manner between the negative output port 234 and the negative input port 232 of the second interface unit 220.

The forward direction of the fifth and seventh diodes 220(5) and 220(7) is opposite to a forward direction of the sixth and eighth diodes 220(6) and 220(8).

The opposite forward directions of diodes 210(5), 210(6), 210(7) and 210(8) prevents the leakage of current through the diodes between the positive and negative input ports (211 and 212) and positive and negative output ports (213 and 214) of the first interface unit 210 and increases the isolation between these ports.

The opposite forward directions of diodes 220(5), 220(6), 220(7) and 220(8) prevents the leakage of current through the diodes between the positive and negative input ports (221 and 222) and positive and negative output ports (223 and 224) of the second interface unit 220 and increases the isolation between these ports. This also prevents a short from occurring regardless of the polarity of the load.

The inclusion of four pairs of FET and diodes per each interface unit decreases the possibility of shorts that will virtually couple the positive and negative ports of an interfacing unit.

Figure 3:
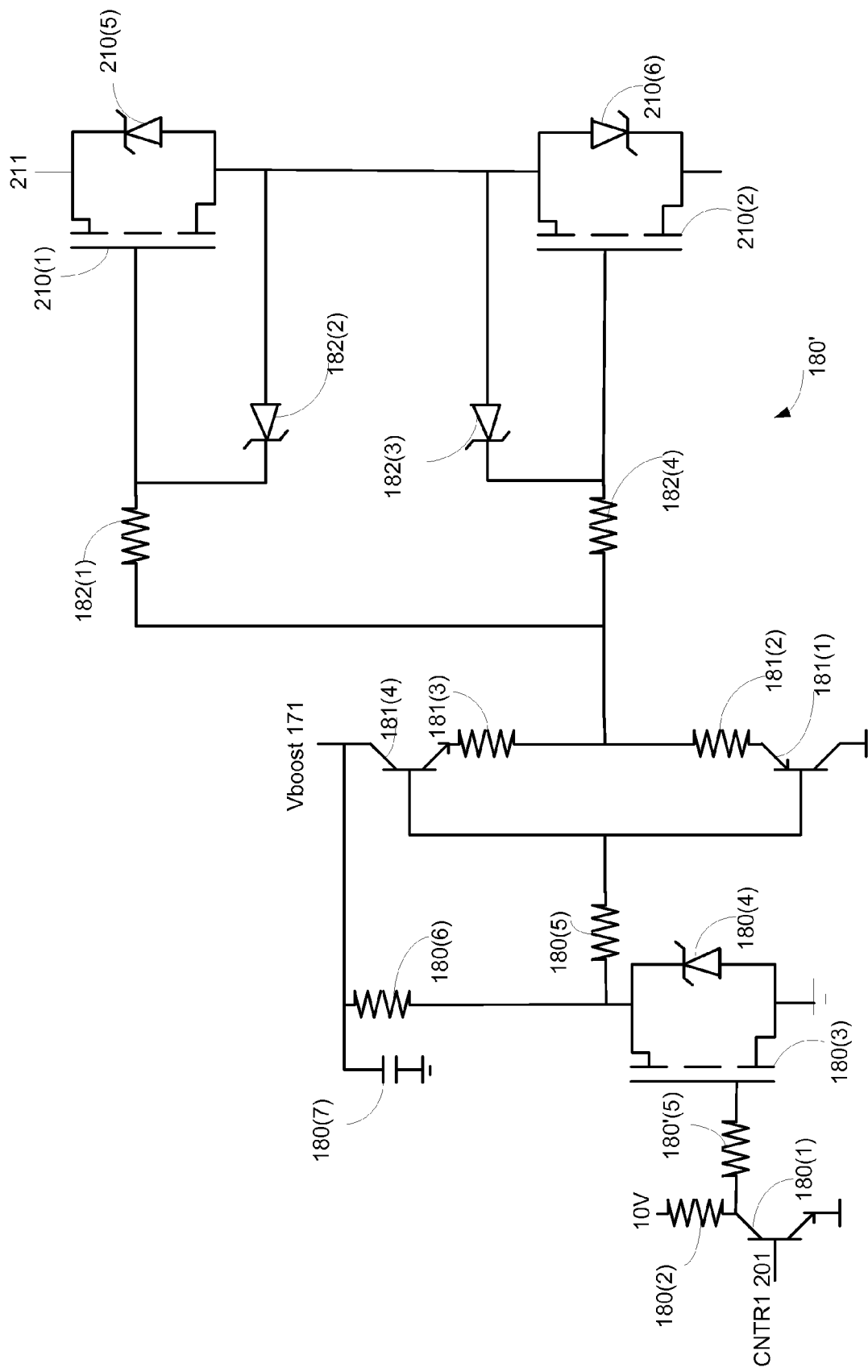
FIG. 3 illustrates a first pair of a (field effect) FET transistor and a diode and a portion of a first control signal driver that drives control signals to the first pair, according to an embodiment of the invention.

FIG. 3 illustrates a first pair of FET transistor 210(1) and diode 210(5) and a portion 180' of first control signal driver 180 that drives control signals to the first pair, according to an embodiment of the invention.

Portion 180' includes: (a) an input stage that include bipolar transistor 180(1) and resistor 180(2); (b) an intermediate stage that includes resistor 180'(5), FET transistor 180(3), diode 180(4), resistors 180(5), 180(6), capacitor 180(7) and a buffer stage that includes a first and second bipolar transistors 181(4) and 181(1) and resistors 181(2) and 181(3); and final stage that include resistors 182(1) and 182(4) and diodes 182(2) and 182(3).

The emitter of transistor 181(1) receives Vboost 171 and this allows the transistor 181(1) to switch a control signals that may equal to Vmax.

The base of bipolar transistor 180(1) receives control signal CNTR1 201 from controller 200, the collector is grounded and its emitter is connected to second end of resistor 180(1) and to a first end of resistor 180'(5). The second end of resistor 180'(5) is connected to a base of FET transistor 180(3).

The FET transistor 180(3) is connected in parallel to diode 180(4) and is further connected between the ground and first ends of resistors 180(5) and 180(6).

The second end of resistor 180(6), the emitter of bipolar transistor 181(1) and the first end of capacitor 180(7) receive Vboost 171.

The bases of bipolar transistors 181(1) and 181(4) are connected to a second end of resistor 180(5). The collector of bipolar transistor 181(1) is grounded and resistors 181(2) and 181(3) are connected in sequence between the collector of bipolar transistor 181(4) and the emitter of bipolar transistor 181(1). The node that connects resistors 181(2) and 181(3) is connected to first ends of resistors 181(1) and 181(4).

The second end of resistor 182(1) is connected to a cathode of diode 182(2) and to the base of first FET transistor 210(1). The second end of resistor 184(1) is connected to a cathode of diode 182(3) and to the base of second FET transistor 210(2). The anodes of diodes 182(2) and 182(3) are connected to a node that connects the first and second pairs of components.

Portion 180' of first control signal driver 180 has to steady states—open and closed. When closed—CNTR1 201 is reset (zero), bipolar transistor 180(1) is closed, the base of FET transistor 180(3) receives a high signal (of about 10 volts) and conducts so as to cause the bases of bipolar transistors 181(1) and 181(4) to receive a low voltage. This causes bipolar transistor 181(4) not to conduct and bipolar transistor 181(1) to conduct—so that FET transistors 210(1) and 210(2) are discharged via bipolar transistor 181(1).

When opened—CNTR1 201 is set (one), bipolar transistor 180(1) is open, the base of FET transistor 180(3) receives a low signal and does not conduct so as to cause the bases of bipolar transistors 181(1) and 181(4) to receive a voltage of about Vboost 171. This causes bipolar transistor 181(1) not to conduct and bipolar transistor 181(4) to conduct—so that FET transistors 210(1) and 210(2) receive at their bases a voltage that may be substantially equal to Vboost and thus conduct.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system for switching between first and second voltage supply units, the system comprising:
    an output unit,
    a first interface unit,
    a second interface unit; and
    a controller;
    wherein the first interface unit is coupled between the first voltage supply unit and the output unit;
    wherein the second interface unit is coupled between the second voltage supply unit and the output unit;
    wherein the controller is arranged to select a selected voltage supply unit and to instruct the first and second interface units and the output unit to facilitate a provision of a selected supply voltage provided from the selected voltage supply unit to a load coupled to the output unit;
    wherein each one of the first and second interface units comprises a positive input port, a negative input port, a positive output port and a negative output port;
    wherein a negative output port of the first interface unit is isolated from a negative output port of the second interface unit; and
    wherein a positive output port of the first interface unit is isolated from a positive output port of the second interface unit, and
    wherein the controller is arranged to prevent the supply the selected supply voltage until the selected supply voltage exceeds a predetermined minimal threshold.

2. The system according to claim 1, wherein a first interface unit comprises:
    a first pair of electrical components that comprise a first field-effect (FET) transistor and a first diode that are coupled in parallel to each other;
    a second pair of electrical components that comprises a second FET transistor and a second diode;
    wherein the first pair and the second pair are coupled to each other in a sequential manner between the positive input port and the positive output port of the first interface unit;
    a third pair of electrical components that comprise a third FET transistor and a third diode that are coupled in parallel to each other; and
    a fourth pair of electrical components that comprises a fourth FET transistor and a fourth diode;
    wherein the third pair and the fourth pair are coupled to each other in a sequential manner between the negative output and input ports of the first interface unit.

3. The system according to claim 2, wherein a forward direction of the first and third diodes is opposite to a forward direction of the second and fourth diodes.

4. The system according to claim 2, wherein the second interface unit comprises:
    a fifth pair of electrical components that comprise a fifth FET transistor and a fifth diode that are coupled in parallel to each other;
    a sixth pair of electrical components that comprises a sixth FET transistor and a sixth diode;
    wherein the fifth pair and the sixth pair are coupled to each other in a sequential manner between the positive input port and the positive output port of the second interface unit;
    a seventh pair of electrical components that comprises a seventh FET transistor and a seventh diode that are coupled in parallel to each other; and
    an eighth pair of electrical components that comprises an eighth FET transistor and an eighth diode;
    wherein the seventh pair and the eighth pair are coupled to each other in a sequential manner between the negative output and input ports of the second interface unit.

5. The system according to claim 4, wherein a forward direction of the fifth and seventh diodes is opposite to a forward direction of the sixth and eighth diodes.

6. A system for switching between first and second voltage supply units, the system comprising:
    an output unit,
    a first interface unit,
    a second interface unit and
    a controller;
    wherein the first interface unit is coupled between the first voltage supply unit and the output unit;
    wherein the second interface unit is coupled between the second voltage supply unit and the output unit;
    wherein the controller is arranged to select a selected voltage supply unit and to instruct the first and second interface units and the output unit to facilitate a provision of a selected supply voltage provided from the selected voltage supply unit to a load coupled to the output unit;
    wherein each one of the first and second interface units comprises a positive input port, a negative input port, a positive output port and a negative output port;
    wherein a negative output port of the first interface unit is isolated from a negative output port of the second interface unit; and
    wherein a positive output port of the first interface unit is isolated from a positive output port of the second interface unit,
    wherein the controller is arranged to stop a provision of supply voltage from a non-selected voltage supply unit until the selected supply voltage exceeds a predetermined minimal threshold.

7. A system for switching between first and second voltage supply units, the system comprising:
    an output unit,
    a first interface unit,
    a second interface unit; and
    a controller;
    wherein the first interface unit is coupled between the first voltage supply unit and the output unit;
    wherein the second interface unit is coupled between the second voltage supply unit and the output unit;
    wherein the controller is arranged to select a selected voltage supply unit and to instruct the first and second interface units and the output unit to facilitate a provision of a selected supply voltage provided from the selected voltage supply unit to a load coupled to the output unit;

wherein each one of the first and second interface units comprises a positive input port, a negative input port, a positive output port and a negative output port;

wherein a negative output port of the first interface unit is isolated from a negative output port of the second interface unit; and wherein a positive output port of the first interface unit is isolated from a positive output port of the second interface unit; and a boost generator that is arranged to provide a boost signal of a value that exceeds values of first and second supply voltage supplied by the first and second voltage supply units; wherein the boost signal is used for controlling the first and second interface units.

8. The system according to claim 7, wherein the boost generator is arranged to provide a boost signal that is higher by a predetermined amount that a maximal voltage out of the first and second supply voltages.

9. The system according to claim 8, wherein the boost generator is arranged to track the maximal voltage.

10. The system according to claim 1, wherein the output unit is a hot swap unit that is arranged to receive first and second supply voltages via the first and second interface units and to switch between the first and second supply voltages.

11. The system according to claim 10, wherein the hot swap unit is arranged to gradually increase an output voltage and to check for a load short before providing an output voltage of a full value to the load.

12. A system for switching between first and second voltage supply units, the system comprising:
   an output unit,
   a first interface unit,
   a second interface unit; and
   a controller;
   wherein the first interface unit is coupled between the first voltage supply unit and the output unit;
   wherein the second interface unit is coupled between the second voltage supply unit and the output unit;
   wherein the controller is arranged to select a selected voltage supply unit and to instruct the first and second interface units and the output unit to facilitate a provision of a selected supply voltage provided from the selected voltage supply unit to a load coupled to the output unit;
   wherein each one of the first and second interface units comprises a positive input port, a negative input port, a positive output port and a negative output port;
   wherein a first interface unit comprises:
      a first pair of electrical components that comprise a first field-effect (FET) transistor and a first diode that are coupled in parallel to each other;
      a second pair of electrical components that comprises a second FET transistor and a second diode;
      wherein the first pair and the second pair are coupled to each other in a sequential manner between the positive input port and the positive output port of the first interface unit;
      a third pair of electrical components that comprise a third FET transistor and a third diode that are coupled in parallel to each other; and
      a fourth pair of electrical components that comprises a fourth FET transistor and a fourth diode; and
      wherein the third pair and the fourth pair are coupled to each other in a sequential manner between the negative output and input ports of the first interface unit,
      wherein the controller is arranged to prevent the supply the selected supply voltage until the selected supply voltage exceeds a predetermined minimal threshold.

13. The system according to claim 12, wherein a forward direction of the first and third diodes is opposite to a forward direction of the second and fourth diodes.

14. The system according to claim 12, wherein the second interface unit comprises:
   a fifth pair of electrical components that comprise a fifth FET transistor and a fifth diode that are coupled in parallel to each other;
   a sixth pair of electrical components that comprises a sixth FET transistor and a sixth diode;
   wherein the fifth pair and the sixth pair are coupled to each other in a sequential manner between the positive input port and the positive output port of the second interface unit;
   a seventh pair of electrical components that comprises a seventh FET transistor and a seventh diode that are coupled in parallel to each other; and
   an eighth pair of electrical components that comprises an eighth FET transistor and an eighth diode;
   wherein the seventh pair and the eighth pair are coupled to each other in a sequential manner between the negative output and input ports of the second interface unit.

15. The system according to claim 14, wherein a forward direction of the fifth and seventh diodes is opposite to a forward direction of the sixth and eighth diodes.

* * * * *